United States Patent
Ahmad et al.

(10) Patent No.: US 10,487,669 B2
(45) Date of Patent: Nov. 26, 2019

(54) TURBINE BLADE WITH A CENTRAL BLOWOUT AT THE TRAILING EDGE

(71) Applicant: Siemens Aktiengesellschaft, Munich (DE)

(72) Inventors: Fathi Ahmad, Kaarst (DE); Andreas Heselhaus, Düsseldorf (DE); Radan Radulovic, Bochum (DE)

(73) Assignee: Siemens Aktiengesellschaft, Munich (DE)

( * ) Notice: Subject to any disclaimer, the term of this patent is extended or adjusted under 35 U.S.C. 154(b) by 324 days.

(21) Appl. No.: 15/031,345

(22) PCT Filed: Oct. 27, 2014

(86) PCT No.: PCT/EP2014/072986
§ 371 (c)(1),
(2) Date: Apr. 22, 2016

(87) PCT Pub. No.: WO2015/063021
PCT Pub. Date: May 7, 2015

(65) Prior Publication Data
US 2016/0281512 A1   Sep. 29, 2016

(30) Foreign Application Priority Data

Oct. 29, 2013 (EP) ..................... 13190714

(51) Int. Cl.
*F01D 5/18* (2006.01)
*F01D 5/28* (2006.01)
(Continued)

(52) U.S. Cl.
CPC ............. *F01D 5/187* (2013.01); *F01D 5/288* (2013.01); *F01D 9/041* (2013.01); *F01D 25/12* (2013.01);
(Continued)

(58) Field of Classification Search
CPC .......... F01D 5/186; F01D 5/187; F01D 5/143; F01D 5/145
See application file for complete search history.

(56) References Cited

U.S. PATENT DOCUMENTS 6,062,817 A    5/2000  Danowski et al.
6,190,128 B1 *  2/2001  Fukuno ................... F01D 5/141
                                                      416/223 A
(Continued)

FOREIGN PATENT DOCUMENTS

CN      1436919 A      8/2003
DE      69921403 T2    3/2006
(Continued)

OTHER PUBLICATIONS

CN Office Action dated Sep. 19, 2016, for CN application No. 201480058729.2.

*Primary Examiner* — Woody A Lee, Jr.
*Assistant Examiner* — Sabbir Hasan
(74) *Attorney, Agent, or Firm* — Beusse Wolter Sanks & Maire

(57) ABSTRACT

A turbine blade with aerodynamic aerofoil, which extends from a bottom to a top end and has two aerofoil walls extending between, which transversely thereto extend from a common leading to a common trailing edge, and with at least one platform, which extends transversely in relation to the aerofoil and is arranged at one of the two ends of the aerofoil. A number of openings are provided in the trailing edge between the bottom end and the top end. Either the opening in the trailing edge arranged closest to the platform surface extends into the platform surface or the platform surface facing the aerofoil is lowered locally in the region of that opening that is closest to the platform, and the opening opens out into a portion of the trailing edge that has become free as a result of the lowering.

9 Claims, 1 Drawing Sheet

(51) Int. Cl.
  *F01D 9/04*  (2006.01)
  *F01D 25/12*  (2006.01)
(52) U.S. Cl.
  CPC .... *F05D 2220/32* (2013.01); *F05D 2240/304* (2013.01); *F05D 2240/81* (2013.01); *F05D 2260/202* (2013.01); *Y02T 50/673* (2013.01); *Y02T 50/676* (2013.01)

(56) References Cited

U.S. PATENT DOCUMENTS

| | | | |
|---|---|---|---|
| 6,328,531 B1 * | 12/2001 | Bariaud | F01D 5/141 |
| | | | 416/97 R |
| 7,775,769 B1 | 8/2010 | Liang | |
| 8,047,787 B1 | 11/2011 | Liang | |
| 2001/0016163 A1 * | 8/2001 | Tomita | F01D 5/186 |
| | | | 416/193 A |
| 2003/0138322 A1 * | 7/2003 | Boury | F01D 5/186 |
| | | | 416/97 R |
| 2008/0085190 A1 | 4/2008 | Liang | |
| 2008/0138208 A1 | 6/2008 | Walters | |
| 2011/0236223 A1 | 9/2011 | Naglet et al. | |
| 2013/0230407 A1 * | 9/2013 | Boyer | F01D 5/186 |
| | | | 416/97 R |

FOREIGN PATENT DOCUMENTS

| | | |
|---|---|---|
| EP | 1333155 A1 | 8/2003 |
| EP | 2602441 A1 | 6/2013 |
| EP | 2602441 B1 | 9/2014 |
| FR | 2782118 A1 | 2/2000 |

* cited by examiner

TURBINE BLADE WITH A CENTRAL BLOWOUT AT THE TRAILING EDGE

CROSS REFERENCE TO RELATED APPLICATIONS

This application is the US National Stage of International Application No. PCT/EP2014/072986 filed Oct. 27, 2014, and claims the benefit thereof. The International Application claims the benefit of European Application No. EP13190714 filed Oct. 29, 2013. All of the applications are incorporated by reference herein in their entirety.

FIELD OF INVENTION

The invention relates to a turbine blade or vane having an aerodynamically curved airfoil, which extends from a root-side end to a head-side end and which comprises two airfoil walls that extend therebetween and extend transversely thereto from a common leading edge to a common trailing edge, and having at least one platform, which extends transversely to the airfoil and is arranged at one of the two ends of the airfoil, wherein a number of openings are provided in the trailing edge between the root-side end and the head-side end.

BACKGROUND OF INVENTION

The turbine blade or vane referred to in the introduction is well known from the extensive prior art available, and is generally referred to as a turbine blade or vane in which the cooling air required internally for cooling the airfoil is blown out centrally at the trailing edge between the suction-side wall and the pressure-side wall. Compared to a cut-back trailing edge, the trailing edge with central blow-out has a thick configuration.

It has been found, however, that overheating phenomena can arise on the platform side downstream of the trailing edge. These instances of overheating can reduce the service life of the turbine blade or vane.

SUMMARY OF INVENTION

It is therefore an object of the invention to provide a durable turbine blade or vane having a central trailing-edge blow-out of cooling air.

The object on which the invention is based is achieved respectively by a turbine blade or vane as per the claims.

According to the first solution, it is provided according to the invention that that opening in the trailing edge which is arranged closest to the platform surface extends as far as into the platform surface. According to the second solution, it is provided that the platform surface facing toward the airfoil is lowered locally, compared to the adjacent regions of the platform, in the region of that opening which is closest to the platform in question, and the opening in question has such a form that it opens out in a trailing-edge portion which has become free by virtue of the lowering.

It is a common feature of both inventions that improved cooling of the platform downstream of the trailing edge can be achieved by increasing the size of that opening which is closest to the platform. By virtue of the reduced distance, or by virtue of the distance being removed, cooling air is blown out close to the platform in such a manner that it is virtually possible to realize film cooling of the platform downstream of the trailing edge. This applies in particular also to other regions of those platforms which are adjacent to the turbine blade or vane in question, if the turbine blades or vanes are used in the gas turbine arranged in a ring during operation.

Consequently, it is provided according to the invention for both solutions that the cooling air can be blown out of the trailing edge yet closer to the wall than previously, this reducing the influence of the hot-gas medium flowing over the platform. This reduces the thermodynamic loading of the turbine blade or vane, as a result of which the service life of the turbine blade or vane can be increased.

According to a first advantageous development of the invention, the opening in question has a greater outflow cross section than the other openings in the trailing edge. This has the effect that firstly the airfoil walls, which converge at the trailing edge, and secondly the region of the trailing edge located downstream can be cooled sufficiently.

According to a further advantageous configuration of the second solution, the lowering is configured with an arrow-shaped contour with two wing regions, wherein—in relation to a medium flowing around the airfoil—an arrowhead-side, but rounded end of the contour is located downstream of the trailing edge and the wing regions on both sides of the airfoil begin upstream of the trailing edge. This makes it possible for the thermomechanical stresses in the material surrounding the lowering to be reduced. The wing regions advantageously begin in the vicinity of the trailing edge. The start of said wing regions is consequently located significantly closer to the trailing edge than to the leading edge of the airfoil.

It is expedient that the turbine blade or vane can be in the form of a guide vane or of a rotor blade, either with one platform or with two platforms. In the latter case, the platforms are then arranged on the airfoil on the head side and on the root side.

If the turbine blade or vane is provided with a heat-insulating protective layer at least on the platform surface, the solution according to the invention makes it possible for said turbine blade or vane to even be protected, if appropriate, from spalling caused by excessive elongation, and this similarly increases the service life of the coated turbine blade or vane.

Further advantages and features of the invention will be explained in more detail with reference to further exemplary embodiments.

DETAILED DESCRIPTION OF INVENTION

In all of the figures, identical features are provided with identical reference signs.

Figure 1:
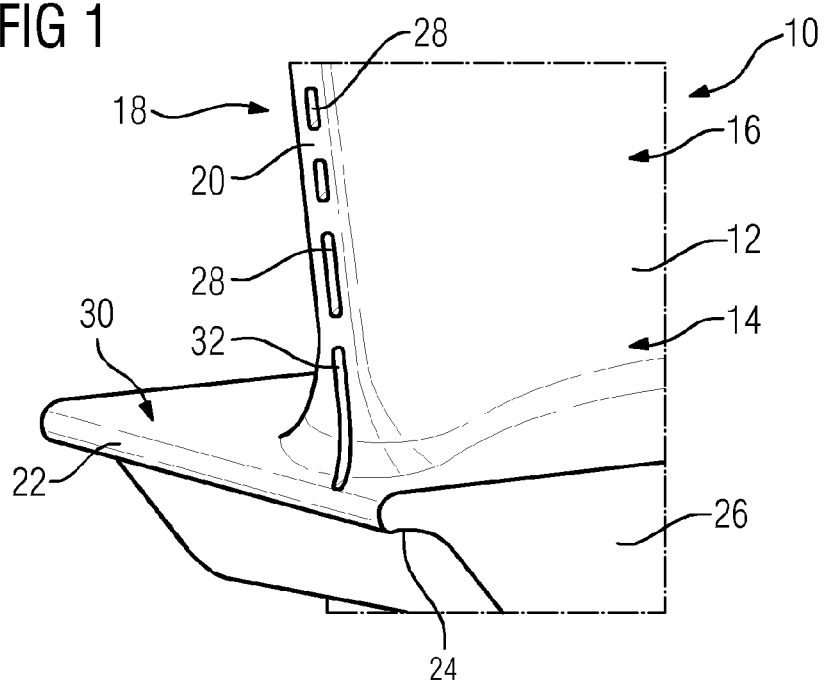
FIG. 1 shows a perspective view of a trailing edge of a turbine blade or vane (shown only in part) according to a first exemplary embodiment.

FIG. 1 shows a turbine blade or vane 10 in part. Like the turbine blades or vanes known from the prior art, the turbine blade or vane 10 shown comprises an aerodynamically curved airfoil 12, which extends from a root-side end 14 to a head-side end (not shown) and in this respect comprises both a pressure-side airfoil wall 16 and, located opposite thereto, a suction-side airfoil wall 18, which—in the direction of flow of a hot gas—extend from a common leading edge (not shown) to a common trailing edge 20. A platform 22 is arranged at the root-side end 14 of the airfoil 12. A blade or vane root 26 is provided at a side 24 of the platform 22 which is remote from the airfoil 12, and can be used to fasten the turbine blade or vane 10 to a supporting structure. If the turbine blade or vane 10 is configured as a rotor blade, the supporting structure is usually a rotor disk or a monolithic rotor block. If, by contrast, the turbine blade or vane 10 is configured as a guide vane, the supporting structure is referred to as a turbine guide vane support.

A number of openings 28 are provided along the trailing edge 20 and in the latter, these openings mostly being arranged in a manner distributed uniformly over the height of the airfoil 12. According to the first exemplary embodiment of the invention, shown in FIG. 1, that opening 32 which is arranged closest to the platform surface 30 has such a form that it extends as far as into the platform surface 30. Therefore, part of the outlet cross section of the opening 32 in question is located in the trailing edge 20 and another part of the outlet cross section is located in the platform surface 30. In contrast thereto, in the prior art the opening 32 ends above that imaginary plane which coincides with the platform surface 30.

Figure 2:
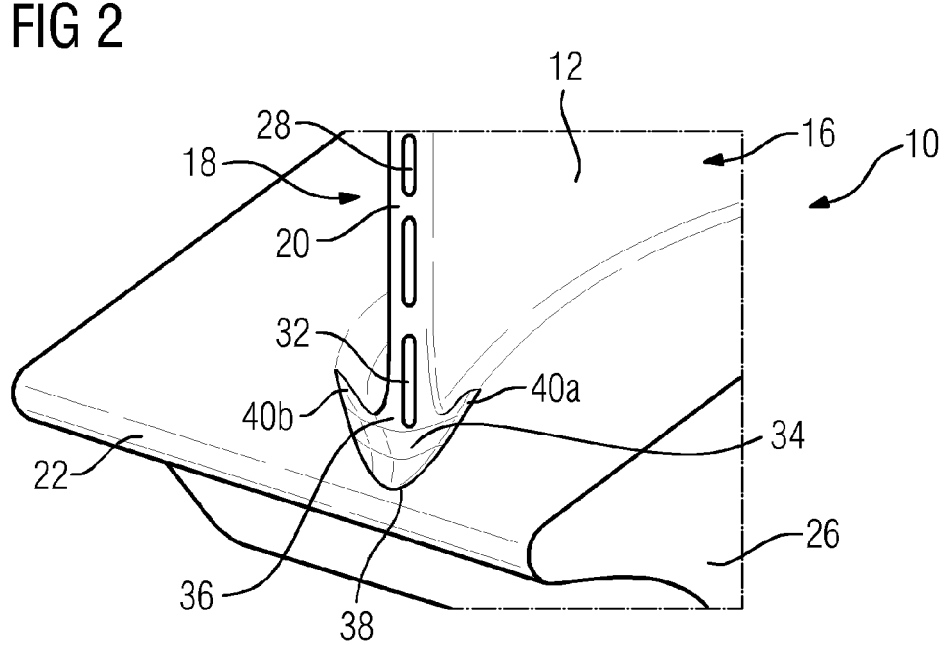
FIG. 2 shows a second exemplary embodiment of a turbine blade or vane according to the invention having a platform lowered locally downstream of the trailing edge.

FIG. 2 shows a second exemplary embodiment of the invention, the features which are identical to FIG. 1 being similarly designated here. In contrast to the first exemplary embodiment, however, it is the case in the second exemplary embodiment that the platform surface 30 is slightly lowered locally downstream of the trailing edge 20, giving rise to a comparatively small lowering 34. Compared to the trailing edge 20 from the first exemplary embodiment, the trailing edge 20 of the second exemplary embodiment is extended slightly on the platform side. This extension is referred to hereinbelow as trailing-edge portion 36. According to the exemplary embodiment shown in FIG. 2, that opening 32 which is closest to the platform 22 has such a form that it opens out in a trailing-edge portion 36 which has become free by virtue of the lowering 34. Part of the opening 32 closest to the platform is therefore located below that plane which coincides for the most part with the platform surface 30.

The lowering 34 has an approximately arrow-shaped contour, and thus comprises two wing regions 40a, 40b and an arrowhead-side and slightly rounded end 38 arranged—in relation to a medium flowing around the airfoil 12—downstream of the trailing edge 20. The contour and thus the lowering 34 are shaped in such a manner that the wing regions 40a, 40b on both sides of the airfoil 12 begin upstream of the trailing edge 20, but not overly far away from said trailing edge 20. In other words, the wing regions 40a, 40b appear in each case to form a barb and begin much closer to the trailing edge 20 than to the leading edge of the airfoil 12.

The invention thus relates as a whole to a turbine blade or vane 10 having an aerodynamic airfoil 12, which extends from a root-side end 14 to a head-side end and which comprises two airfoil walls 16, 18 that extend therebetween and extend transversely thereto from a common leading edge to a common trailing edge 20, and having at least one platform 22, which extends transversely to the airfoil 12 and is arranged at one of the two ends 14 of the airfoil 12, wherein a number of openings 28, 32 are provided in the trailing edge 20 between the root-side end and the head-side end. In order to reduce the thermomechanical stresses introduced by the hot gas in the platform 22 of the turbine blade or vane 10 and to thereby obtain a durable turbine blade or vane 10, it is provided according to the invention that either that opening 32 in the trailing edge 20 which is arranged closest to the platform surface 30 extends as far as into the platform surface 30, or that the platform surface 30 facing toward the airfoil 12 is lowered locally in the region of that opening 28 which is closest to the platform 22 in question, and the opening 32 in question has such a form that it opens out into a trailing-edge portion 36 which has become free by virtue of the lowering 34.

The invention claimed is:

1. A turbine blade or vane, comprising:
an aerodynamically curved airfoil, which extends from a root-side end to a head-side end and which comprises two airfoil walls that extend therebetween and extend transversely thereto from a common leading edge to a common trailing edge where the two airfoil walls merge together, a platform which extends transversely to the airfoil and which is arranged at one end of the root-side end and the head-side end, and a fillet transition between the airfoil and the platform, wherein an interface line is formed where the fillet transition meets a platform surface,
wherein a number of openings are provided through the trailing edge between the root-side end and the head-side end which are configured to blow out cooling air centrally between the two airfoil walls,
wherein an extended opening of the number of openings in the trailing edge is arranged closest to the platform surface and extends into the platform surface so that part of an outlet cross section of the extended opening is located in the trailing edge and another part of the outlet cross section extends downstream through the interface line and into the platform surface, the extended opening effective to create film cooling of the platform downstream of the trailing edge.

2. The turbine blade or vane as claimed claim 1, wherein the extended opening comprises a greater outflow cross section than other openings of the number of openings.

3. The turbine blade or vane as claimed in claim 1, wherein the platform is coated.

4. The turbine blade or vane as claimed in claim 1, wherein the turbine blade or vane is in the form of a guide vane or of a rotor blade.

5. A turbine blade or vane, comprising:
an aerodynamically curved airfoil, which extends from a root-side end to a head-side end and which comprises two airfoil walls that extend therebetween and extend transversely thereto from a common leading edge to a common trailing edge where the two airfoil walls merge together, and a platform which extends transversely to the airfoil and which is arranged at one end of the root-side end and the head-side end,
wherein a number of openings are provided through the trailing edge between the root-side end and the head-side end which are configured to blow out cooling air centrally between the two airfoil walls,
wherein a platform surface facing toward the airfoil is lowered locally in a region of an extended opening of the number of openings which is closest to the platform and wherein the extended opening opens out in a trailing-edge portion disposed in the locally lowered surface of the platform,
wherein the lowering comprises an arrow-head between two wing regions that form a shape of a downstream-pointing arrow, and
wherein, in relation to a medium flowing around the airfoil, the arrow-head is arranged downstream of the trailing edge and the two wing regions on both sides of the airfoil begin upstream of the trailing edge.

6. The turbine blade or vane as claimed in claim 5, wherein the two wing regions begin in a vicinity of the trailing edge.

7. The turbine blade or vane as claimed claim 5, wherein the extended opening comprises a greater outflow cross section than other openings of the number of openings.

8. The turbine blade or vane as claimed in claim 5, wherein the platform is coated.

9. The turbine blade or vane as claimed in claim 5, wherein the turbine blade or vane is in the form of a guide vane or of a rotor blade.

* * * * *